(12) United States Patent
Cohen et al.

(10) Patent No.: US 7,664,897 B2
(45) Date of Patent: Feb. 16, 2010

(54) METHOD AND APPARATUS FOR COMMUNICATING OVER A RESOURCE INTERCONNECT

(75) Inventors: Earl T. Cohen, Oakland, CA (US); Donald Steiss, Richardson, TX (US); William Eatherton, San Jose, CA (US); John Williams, Jr., Pleasanton, CA (US); John A. Fingerhut, Laguna Hills, CA (US)

(73) Assignee: Cisco Technology Inc., San Jose, CA (US)

( * ) Notice: Subject to any disclaimer, the term of this patent is extended or adjusted under 35 U.S.C. 154(b) by 630 days.

(21) Appl. No.: 11/293,285

(22) Filed: Dec. 1, 2005

(65) Prior Publication Data

US 2006/0179204 A1 Aug. 10, 2006

Related U.S. Application Data

(63) Continuation-in-part of application No. 11/054,076, filed on Feb. 8, 2005, now Pat. No. 7,551,617.

(51) Int. Cl.
G06F 13/42 (2006.01)
G06F 13/14 (2006.01)
G06F 13/00 (2006.01)
H04L 12/28 (2006.01)

(52) U.S. Cl. ............... 710/105; 710/305; 710/317; 370/351; 370/352

(58) Field of Classification Search ........... 710/305, 710/105, 317; 370/351, 352
See application file for complete search history.

(56) References Cited

U.S. PATENT DOCUMENTS 4,442,484 A * 4/1984 Childs et al. ............... 711/163

| 4,491,945 | A | 1/1985 | Turner |
| 4,494,230 | A | 1/1985 | Turner |
| 4,630,260 | A | 12/1986 | Toy et al. |
| 4,734,907 | A | 3/1988 | Turner |
| 4,755,986 | A | 7/1988 | Hirata |
| 4,829,227 | A | 5/1989 | Turner |

(Continued)

FOREIGN PATENT DOCUMENTS

EP 1085723 5/2003

(Continued)

OTHER PUBLICATIONS

PCT/US2006/000602; International Search Report and Written Opinion; Mailed Jan. 29, 2008.

(Continued)

*Primary Examiner*—Mark Rinehart
*Assistant Examiner*—Jeremy S Cerullo
(74) *Attorney, Agent, or Firm*—Stolowitz Ford Cowger LLP

(57) ABSTRACT

A resource interconnect architecture and associated descriptor protocol provides more efficient communication between different resources in a data processing system. One embodiment uses a backdoor interconnect that allows some resources to communicate without using a central resource interconnect. Another embodiment uses nested descriptors that allow operations by different resources to be chained together without having to communicate back to an originating descriptor resource. In another embodiment, the descriptors are generated in hardware or in software. Other embodiments assign priority or privilege values to the descriptors that optimize processing and error handling performance.

29 Claims, 8 Drawing Sheets

U.S. PATENT DOCUMENTS

| | | |
|---|---|---|
| 4,849,968 A | 7/1989 | Turner |
| 4,866,701 A | 9/1989 | Giacopelli et al. |
| 4,893,304 A | 1/1990 | Giacopelli et al. |
| 4,901,309 A | 2/1990 | Turner |
| 5,127,000 A | 6/1992 | Henrion |
| 5,151,988 A | 9/1992 | Yamagishi |
| 5,173,897 A | 12/1992 | Schrodi et al. |
| 5,179,551 A | 1/1993 | Turner |
| 5,179,556 A | 1/1993 | Turner |
| 5,229,991 A | 7/1993 | Turner |
| 5,247,629 A | 9/1993 | Casamatta et al. |
| 5,253,251 A | 10/1993 | Aramaki |
| 5,260,935 A | 11/1993 | Turner |
| 5,327,556 A | 7/1994 | Mohan et al. |
| 5,339,311 A | 8/1994 | Turner |
| 5,402,415 A | 3/1995 | Turner |
| 5,430,850 A | 7/1995 | Papadopoulos et al. |
| 5,450,411 A | 9/1995 | Heil |
| 5,551,046 A | 8/1996 | Mohan et al. |
| 5,682,537 A | 10/1997 | Davies et al. |
| 5,699,500 A | 12/1997 | Dasgupta |
| 5,842,040 A | 11/1998 | Hughes et al. |
| 5,845,129 A | 12/1998 | Wendorf et al. |
| 5,845,147 A | 12/1998 | Vishlitzky et al. |
| 5,896,501 A | 4/1999 | Ikeda et al. |
| 5,905,725 A | 5/1999 | Sindhu et al. |
| 5,949,780 A | 9/1999 | Gopinath |
| 5,987,506 A | 11/1999 | Carter et al. |
| 6,032,190 A | 2/2000 | Bremer et al. |
| 6,128,666 A | 10/2000 | Muller et al. |
| 6,161,144 A | 12/2000 | Michels et al. |
| 6,163,856 A | 12/2000 | Dion et al. |
| 6,170,025 B1 | 1/2001 | Drottar et al. |
| 6,253,273 B1 | 6/2001 | Blumenau |
| 6,405,274 B1 | 6/2002 | Chan |
| 6,411,983 B1 | 6/2002 | Gallop |
| 6,473,849 B1 | 10/2002 | Keller et al. |
| 6,529,983 B1 | 3/2003 | Marshall et al. |
| 6,553,464 B1 | 4/2003 | Kamvysselis et al. |
| 6,563,790 B1 | 5/2003 | Yu et al. |
| 6,601,138 B2 | 7/2003 | Otterness |
| 6,920,447 B2 | 7/2005 | Pudipeddi et al. |
| 6,947,425 B1 | 9/2005 | Hooper et al. |
| 7,093,027 B1 | 8/2006 | Shabtay et al. |
| 7,100,020 B1 | 8/2006 | Brightman et al. |
| 7,120,631 B1 | 10/2006 | Vahalia et al. |
| 7,210,022 B2 | 4/2007 | Jungck et al. |
| 7,304,999 B2 | 12/2007 | Sukonik |
| 7,313,557 B1 | 12/2007 | Noveck |
| 7,362,762 B2 | 4/2008 | Williams et al. |
| 7,404,015 B2 | 7/2008 | Zemach et al. |
| 7,551,617 B2 | 6/2009 | Eatherton |
| 2001/0049744 A1 | 12/2001 | Hussey et al. |
| 2002/0080789 A1 | 6/2002 | Henderson et al. |
| 2002/0184216 A1 | 12/2002 | Chandrasekaran et al. |
| 2004/0037322 A1 | 2/2004 | Sukonik et al. |
| 2004/0039787 A1 | 2/2004 | Zemach et al. |
| 2004/0039815 A1 | 2/2004 | Evans et al. |
| 2004/0117790 A1 | 6/2004 | Rhine |
| 2004/0143712 A1 | 7/2004 | Armstrong et al. |
| 2005/0015686 A1 | 1/2005 | Atoji et al. |
| 2005/0100017 A1 | 5/2005 | Williams et al. |
| 2005/0163143 A1 | 7/2005 | Kalantar et al. |
| 2005/0216461 A1 | 9/2005 | Williams et al. |
| 2005/0220112 A1 | 10/2005 | Williams et al. |
| 2006/0179156 A1 | 8/2006 | Eatherton et al. |
| 2006/0221823 A1 | 10/2006 | Shoham |
| 2007/0008989 A1* | 1/2007 | Joglekar ..................... 370/469 |
| 2007/0014240 A1 | 1/2007 | Kumar et al. |
| 2007/0022429 A1 | 1/2007 | Rosenbluth et al. |
| 2007/0198792 A1 | 8/2007 | Dice et al. |

FOREIGN PATENT DOCUMENTS

| | | |
|---|---|---|
| WO | 0209307 | 1/2002 |
| WO | 0239667 | 5/2002 |
| WO | 2004019571 | 3/2004 |
| WO | WO 2004/019571 A2 | 3/2004 |

OTHER PUBLICATIONS

PCT/US2006/000602; International Preliminary Report on Patentablility and Written Opinion of the International Searching Authority; Issued Mar. 10, 2009.

Jonathan S. Turner, "An Optimal Nonblocking Multicast Virtual Circuit Switch," Jun. 1994, Proceedings of Infocom, 8 pages.

Yun et al. "An Efficient Locking Protocol for the Home Based Lazy Release Consistency," Proceedings of the First IEEE/ACM International Symposium on Cluster Computing and The Grid, pp. 527-532; May 2001.

Chaney et al., "Design of a Gigabit ATM Switch," Feb. 5, 1996, WUCS-96-07, Washington University, St. Louis MO, 20 pages.

Trancoso et al., "The Impact of Speeding up Critical Sections with Data Prefetching and Forwarding", 1996 International Conference on Parallel Processing, pp. 111-79-111-86, 1996 IEEE.

Stolowitz Ford Cowger LLP, Listing of Related Cases, Jul. 20, 2009.

* cited by examiner

METHOD AND APPARATUS FOR COMMUNICATING OVER A RESOURCE INTERCONNECT

The present application is a continuation-in-part of patent application Ser. No. 11/054,076, filed Feb. 8, 2005, now U.S. Pat. No. 7,551,617 entitled: MULTI-THREADED PACKETING PROCESSING ARCHITECTURE, which is herein incorporated in its entirety.

BACKGROUND

Computer processing architectures may include multiple different co-processing units that need to inter-communicate and exchange information with each other, and also with shared resources. Some of these computer architectures use cross-bar switches, mesh networks, Clos networks, etc., to interconnect the different co-processing units and shared resources together. Bottlenecks are created in these centralized interconnect architectures when different co-processing units try to communicate to the same destination over the cross-bar switch at the same time. These bottlenecks increase data processing latency and reduce the overall processing throughput of the processing system.

The present invention addresses this and other problems associated with the prior art.

SUMMARY OF THE INVENTION

A resource interconnect architecture and associated descriptor protocol provides more efficient communication between different resources in a data processing system. One embodiment uses a backdoor interconnect that allows some resources to communicate without using a central resource interconnect. Another embodiment uses nested descriptors that allow operations by different resources to be chained together without having to communicate back to an originating descriptor resource. In another embodiment, the descriptors are generated in hardware or in software. Other embodiments assign priority or privilege values to the descriptors that optimize processing and error handling performance.

The foregoing and other objects, features and advantages of the invention will become more readily apparent from the following detailed description of a preferred embodiment of the invention which proceeds with reference to the accompanying drawings.

DETAILED DESCRIPTION

Figure 1:
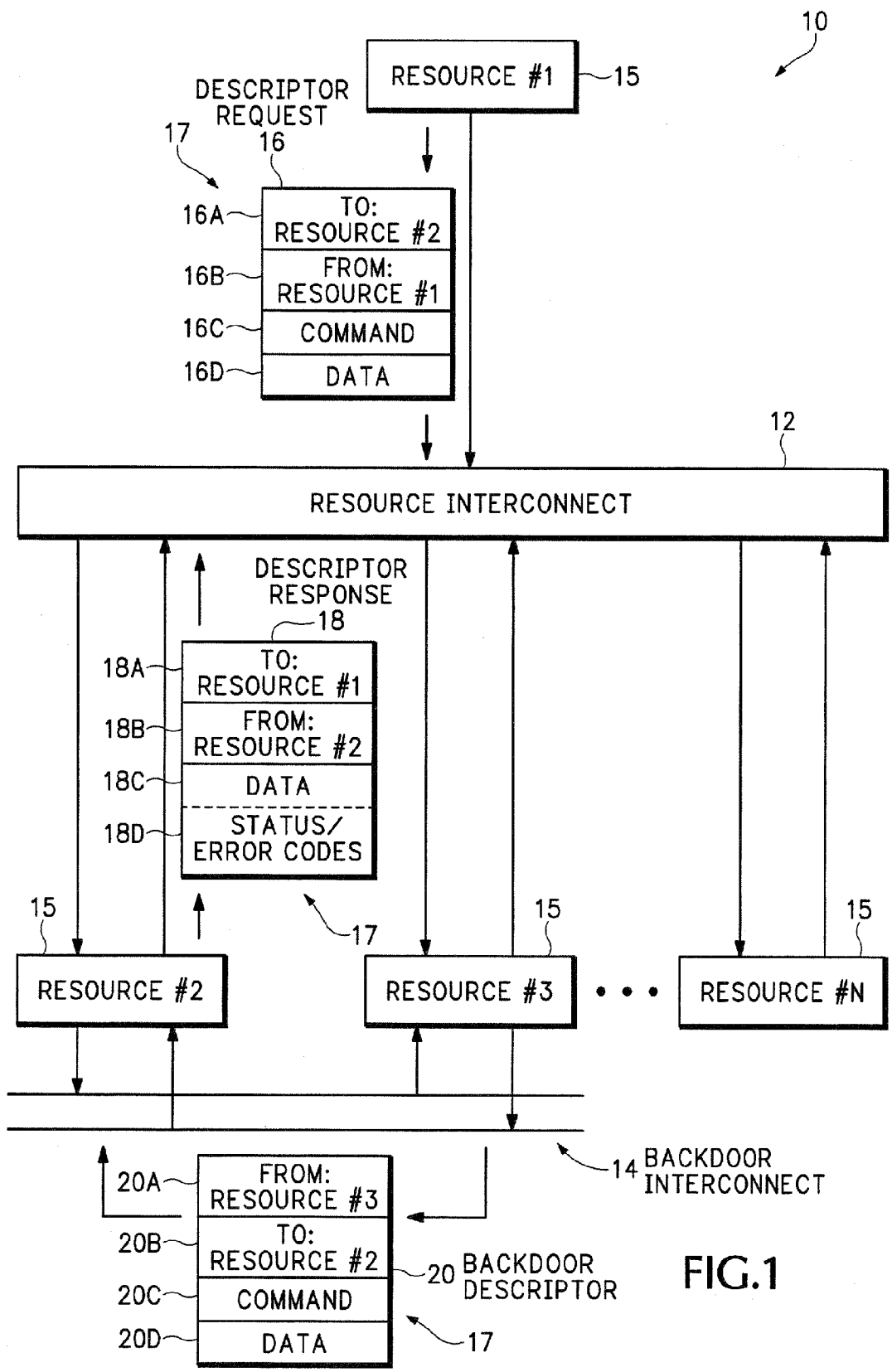
FIG. 1 is a block diagram of a data processing system that includes a backdoor interconnect.

FIG. 1 shows a data processing system 10 that includes multiple resources 15 that are connected together through a resource interconnect 12. The resources 15 can be any type of data processing or storage device that may need to communicate with another processing or storage element. In one example, the data processing system 10 may be a packet processor used in a network router, switch, gateway, or any other network processing device. In the packet processor example, the resources 15 can be any data processing or storage units that process or store packets. One example packet processor implementation is described in more detail below in FIG. 6.

The resource interconnect 12 can be any type of cross-bar switch or other switching circuitry that connect the different resources 15 together. For example, the resource interconnect 12 may be a series of multiplexer units or interconnection mesh that selectively connect the different resources 15. These types of interconnects are known to those skilled in the art and are therefore not described in further detail.

In one implementation, descriptors 17 are used for communicating across the resource interconnect 12. For example, a first resource 1 may need to read or write to resource 2, or may need to hand off processing for a particular piece of data to resource 2. Resource 1 conducts this operation by forming and sending a descriptor request 16 over resource interconnect 12 to resource 2. In some embodiments, there may be distinct sets of source and destination resources. In other embodiments, some or all of the resources might be capable of being both sources and destinations.

Many formats of these descriptors are possible within the scope of this invention. In one embodiment, the descriptor request 16 includes a destination identifier 16A that identifies resource 2 and a source identifier 16B that identifies resource 1 as the source of descriptor request 16. The source identifier 16B might include further details, such as a requesting sub-unit within resource 1, in order to allow resource 1 to match up a later response to this request with its list of outstanding requests. The descriptor request 16 can also include a command 16C to be executed by resource 2 and any data 16D needed for performing the command 16C. The resource interconnect 12 accordingly forwards the descriptor request 16 to the resource 2 associated with destination identifier 16A. In some embodiments, the destination identifier may be sufficient to provide the correct path through the resource interconnect. In other embodiments, the resource interconnect might perform routing (choosing a path) in order to send descriptor request 16 to destination resource 2.

In some embodiments, resource 2 may include a queue or FIFO or other data structure, possibly one that is per-source and/or per-priority, to temporarily store incoming descriptor requests. Descriptor request 16 may first be stored in such a structure, or it may be immediately processed by resource 2. Furthermore, resource 2 could be capable of processing multiple descriptor requests in parallel, or perhaps starting new requests as fast as they can arrive. None of which implies anything about how long resource 2 might take to process each descriptor request, whether they have to be processed in a fixed amount of time, or whether they have to be processed in their order of arrival, or in an order specified by the command 16C in the descriptor, or in some other prioritized fashion. All of these variations are within the scope of this invention.

When resource 2 starts processing descriptor request 16, it executes command 16C and processes any associated data 16D. For example, if resource 2 is a memory unit, the command 16C may be a memory read or write instruction and the data 16D may include the address for reading or writing data. For a write command 16C, the data 16D may also include, for example, packet or other data, for writing into the identified address. In some embodiments, even a simple unit such as a memory unit could accept complex commands, such as "add to location", where the address specifies a memory location which is read, the provided data is added to the value obtained, and the result is written back to the same address.

Alternatively, resource 2 may be another data processing unit that resource 1 uses for offloading other data processing tasks. For example, in the packet processor example, resource 2 may be an ancillary co-processor used for additional packet gathering, assembling, queuing, authentication, decryption, sequencing, etc., after other packet operations are completed by resource 1.

In this example, the descriptor request 16 may include a resource command 16C that directs resource 2 to conduct the gathering, assembly, queuing, decryption, or other operations on the packet data. The data 16D may identify a memory location in this or another resource that contains the packet or other data, or may include the actual data.

After receiving or completing the resource command 16C, resource 2 sends a descriptor response 18 back to resource 1. In some embodiments, resource 2 uses the source identifier 16B from descriptor request 16 as the destination identifier 18A in descriptor response 18. The descriptor response 18 may also include the source identifier 18B for resource 2 and may also contain any data 18C or status/error codes 18D resulting from the executed command 16C. For instance, in the memory read example, the data 18C may comprise the contents in memory resource 2 corresponding to an address 16D in descriptor request 16, and the status/error code 18D may indicate whether the referenced memory location was read correctly, or experienced an ECC error. Alternatively, the descriptor response 18 may not contain any data 18C and may simply contain a message acknowledging that the descriptor request 16 was received, or whether the command 16C was successfully executed.

Resource 2 may not immediately send the descriptor response 18 back to resource 1, as the response may also need to travel over a resource interconnect, which may or not be the same as resource interconnect 12. Furthermore, responses may need to be ordered (if they are completed out of order), or may need to be sent in a prioritized order, or in an order specified at least in part by command 16C. Accordingly, resource 2 may employ a queue or FIFO or other data structure, possibly one that is per-resource or per-priority, in order to store the responses going back to the requesting resources. The order in which such a data structure is served might also depend, at least in part, on the capabilities or congestion state of the resource interconnect which is used to return the responses.

It is important to note that in one embodiment, any combination of resources 15 can send and receive descriptors 17 to and from any of the other resources 15. Further, the descriptors 17 can have any arbitrary sized header and data length. In other embodiments, resource interconnect 12 might be comprised of separate resource interconnects connecting possibly overlapping subsets of the resources, or might be comprised of separate request and response resource interconnects, or any combination thereof. Furthermore, if there are multiple resource interconnects, there is no implication that they must be identical in type or size or speed, as these parameters of the resource interconnect should be optimized for the specific use and application thereof.

Backdoor Interconnects

There may be situations where multiple different resources 15 need to communicate with each other over the resource interconnect 12 at the same time. This can create bottlenecks that can delay data processing while associated descriptor requests 16 or descriptor responses 18 wait to be transferred over resource interconnect 12. For example, in the packet processor implementation, a Forwarding Information Base (FIB) lookup may require a look-up resource (e.g., resource 1) to continuously access a memory device (e.g., resource 2) containing routing tables. This high memory usage can substantially delay other packet processing operations that also communicate over resource interconnect 12.

To reduce these bottlenecks, one embodiment of the data processing system 10 includes a backdoor interconnect 14 that provides an alternative communication path between certain resources 15. The backdoor interconnect 14 can be used between any combination of resources 15 depending on the types of traffic patterns that generally exist between the different resources 15. In some embodiments, there could be multiple backdoor interconnects connecting different sets of resources.

In one example, resources 15 that generally conduct lower priority data processing operations may also be connected together via the backdoor interconnect 14. Alternatively, resources 15 that primarily communicate with one or a few other resources 15 may be connected to those resources via the backdoor interconnect 14. Of course any other criteria may also be used for determining which resources 15 are connected to each other via the backdoor interconnect 14. In an opposite example, resources 15 that continuously need to communicate between each other may also be connected together though backdoor interconnect 14.

In one implementation, the same descriptors 17 used for communicating over the resource interconnect 12 are also used for communicating over backdoor interconnect 14. In another embodiment, backdoor interconnect 14 could use an independent request/response format. Furthermore, if there are multiple backdoor interconnects, they may each use their own request/response format, one specifically designed for their usage.

As shown in FIG. 1, the backdoor descriptor 20 also includes a source identifier 20A, destination identifier 20B, command 20C, and data 20D similar to descriptor 16. The backdoor interconnect 14 allows the same resource 15 to receive and/or transmit two descriptors 16 and 20 at the same time. The usage of a backdoor interconnect does not imply that requests received on the backdoor interconnect must generate responses on the backdoor interconnect. Depending on the type of resource, the command in the descriptor, and possibly the result of executing the command, requests might arrive on either resource interconnect 12 or backdoor interconnect 14, and responses to those requests might be sent on either resource interconnect 12 or backdoor interconnect 14.

It is also important to note that nothing in this description has implied that a response must either go back to the same resource which generated the original request, or must come from the destination resource which first processes the request. For example, certain commands might contain information indicating where the response is to be sent, or the failure to execute certain commands might send a response to an error-handling resource rather than the requesting resource. Furthermore, multiple responses to one resource, even from different requests, might be combined in to a single response descriptor.

Descriptors

Nested Descriptors

Figure 2:
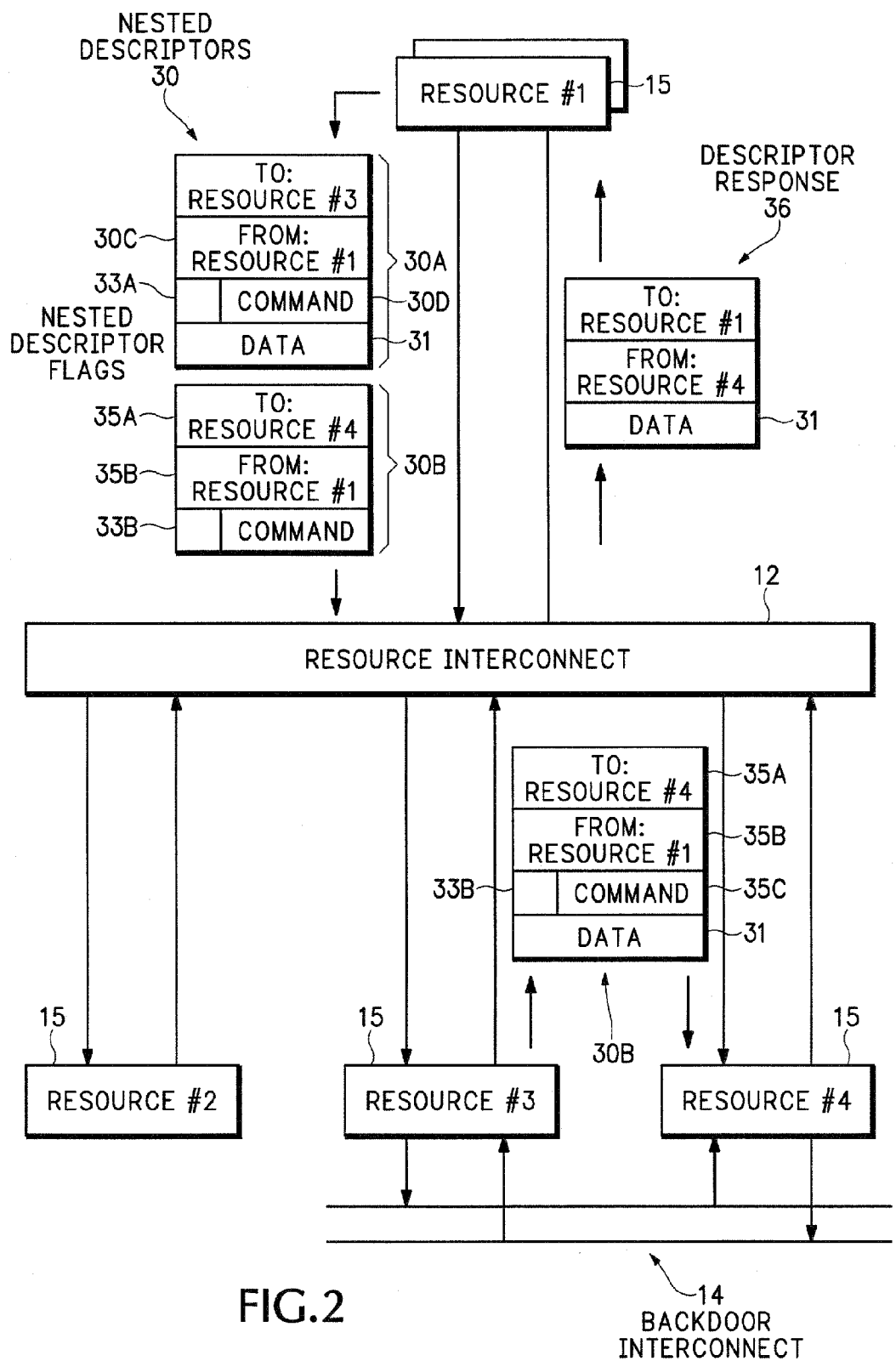
FIG. 2 is a block diagram showing how nested descriptors are used in the data processing system shown in FIG. 1.

FIG. 2 shows how processing by different resources 15 can be chained together using a same nested descriptor 30. There may be situations where several different resources 15 may need to process the same data, or each may need to process the result of the previous one. For example, after being processed by resource 1, data 31, or the result obtained from resource 1's processing of data 31, may also need to be processed by resource 3, and then further processed by resource 4. Nested descriptors 30 allow each resource 15 to process the data and then independently forward the data onto a next resource 15 in the processing chain. This eliminates each resource 15 from having to respond back to the resource 1 that originally sent the descriptor request.

To explain further, nested descriptors 30 include a first descriptor request 30A that is directed to resource 3 and a second descriptor request 30B that is directed to another resource 4. Each descriptor 30A and 30B can include a flag 33, or some other command, which indicates whether or not the descriptor currently being processed includes another descriptor that needs to be forwarded to another resource, other than the resource identified in source identifier 30C. In some embodiments, the second descriptor may not be a full descriptor, as some or all of its contents may be supplied by the first descriptor, possibly as an implicit function of the command in the first descriptor, or possibly by copying the corresponding fields from the first descriptor.

Resource 1 sends nested descriptors 30 to resource 3 via resource interconnect 12. While processing descriptor 30A, resource 3 is notified by flag 33A that another descriptor 30B is contained in the same nested message 30. After completing execution of command 30D, resource 3 forwards the descriptor 30B to the resource 4 corresponding with resource identifier 35A.

In this case, resource 3 forwards the descriptor 30B to resource 4 independently of any intermediate communication with resource 1. This prevents resource 3 from having to send the partially processed data 31 back to resource 1 and then resource 1 having to send another descriptor request to resource 4. It should also be noted that descriptor 30B could be sent to resource 4 either over the resource interconnect 12 or over the backdoor interconnect 14, if a backdoor interconnect 14 exists between resources 3 and 4.

Resource 4 determines from flag 33B, or some particular command 35C, that no nested descriptors exist in descriptor 30B. Accordingly, after completing execution of command 35C, resource 4 sends a descriptor response 36 back to the resource 1 corresponding with source identifier 35B. In some embodiments, descriptor 30B might just be a partial descriptor. For example, the source identifier 35B might not be necessary as it could be copied by resource 3 from source identifier 30C.

It may also be the case that the type of command sent to a resource implicitly determines that nested processing is required, and which resource is next used in the processing chain. For example, one command to a hash-mod-read resource might hash its data and add an offset to produce a memory address. The resource then sends a descriptor to a memory unit which will read the memory data at the resulting address, sending the resulting memory contents back to the original requester. One example of this type of hashing operation is described in co-pending patent application Ser. No. 11/189,584, filed Jul. 25, 2005, entitled "HASHING ASSIST FOR NETWORK PROCESSORS".

Any of the resources 15 described above, may include hardware that automatically generates some or all of the descriptors. This eliminates the resources 15 from having to generate the descriptors in software and allows the programming model to be essentially the same for descriptor and non-descriptor resource access, where in a non-descriptor resource access, the hardware could generate the descriptors from other information in a software operation. For example, one embodiment has hardware which, on a data cache miss, creates a descriptor to access the memory unit in order to fetch the desired line in to the data cache. Such hardware-based descriptor generation is described below in FIG. 8. Hardware based descriptors are also described in co-pending provisional patent application Ser. No. 60/732,079, filed Oct. 31, 2005, entitled COMMUNICATION IN NETWORK PROCESSORS, which is herein incorporated by reference.

Figure 3:
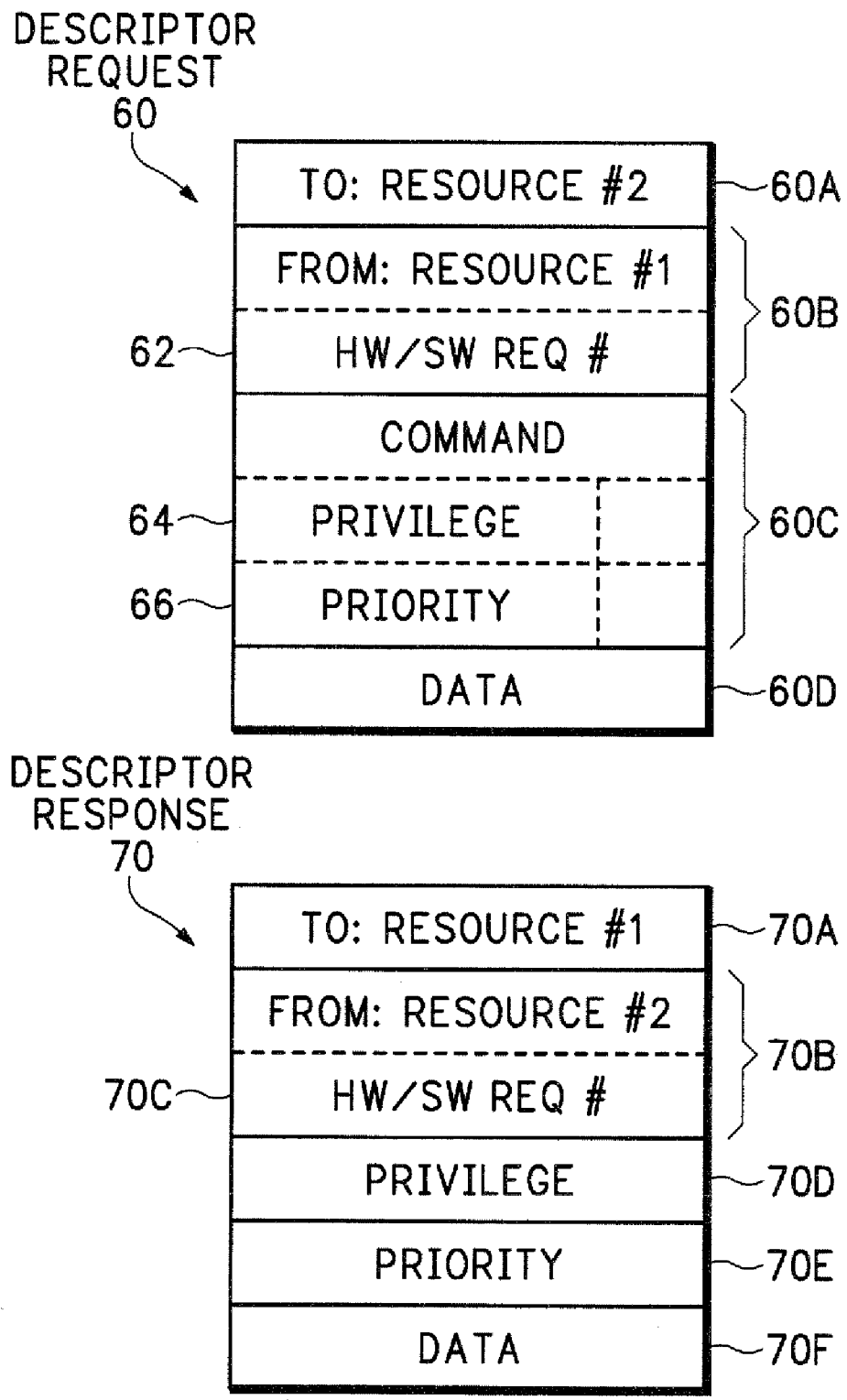
FIG. 3 is a diagram showing the descriptors used in the data processing system.

FIG. 3 shows an example descriptor request 60 and descriptor response 70 in more detail. A hardware/software request number 62 can identify the descriptor 60 as either a hardware-generated request or a software-generated request. Each resource 15 may only be allowed a particular number of outstanding hardware and software descriptor requests 60. Thus, the request number 62 allow resources 15 to track a number of outstanding hardware and/or software requests, and to distinguish their later responses. In some embodiments, the request number 62 is appended to the source identifier 60B. In such an embodiment, the resource interconnect may ignore a lower-order portion of the source and/or destination resource identifiers which represents a sub-unit within the source or destination resource.

The resource 15 receiving the descriptor request 60 sends back the descriptor response 70 either when the descriptor request 60 is received or executed. The descriptor response 70 includes a hardware/software request number 70C corresponding with the request number 62 in descriptor request 60. The resource 15 sending the descriptor request 60 uses the response number 70C in descriptor response 70 to associate this response with one of the outstanding hardware and software descriptor requests 60. The requesting resource may process the descriptor response 70 using descriptor hardware logic when the request identifier 70C corresponds to a hardware-generated descriptor request. Otherwise, the descriptor may be processed by software descriptor logic.

In another embodiment, the descriptor request 60 does not include a request number 62, and the descriptor response 70 likewise does not include a request identifier 70C. The requesting resource may associate hardware and software responses with the corresponding requests in a number of other ways, such as through information in the returned data, or via the source identifier in descriptor response 70, or through other means.

Descriptor Privilege

The descriptors can also include an associated privilege value 64 used for identifying operations of particular importance. For example, some descriptor requests 60 may be associated with individual packet processing operations that may only affect one packet or one associated packet flow. On the other hand, some descriptor requests 60 may be associated with supervisory or kernel operations that can affect all processing in the data processing system 10 (FIG. 1). In the packet processor embodiment for instance, a high privilege descriptor request 60 may be associated with updating a routing table.

The privilege identifier 64 is used to distinguish these highly important descriptor requests from other descriptor requests. If a highly privileged descriptor request 60 fails, the resource 15 processing the request may send out a fatal failure notification. Alternatively, the resource 15 processing the failed highly privileged descriptor request 60 may send a corresponding high privilege identifier 70D in the descriptor response 70. The resource receiving the descriptor response 70 may then generate the fatal failure notification. Conversely, if a low privilege descriptor request fails, the resource may only send a routine packet failure response to the sending resource.

The privilege identifiers 64 and 70D allow the data processor system 10 to more effectively identify and handle system errors. For example, an error occurring in a non-privileged descriptor request 60 may not be fatal and therefore does not require a complete computing system shutdown. For instance, the non-privileged processing error may simply require the processing system 10 to request a data retransmission from another processing device or cause the processing system 10 to drop the data associated with the failed descriptor operation.

Alternatively, a privileged descriptor request 60 may be associated with a fatal error that then causes the system 10 to reboot or crash. The ability to distinguish between fatal and non-fatal system errors allow the processing system to continue to operate during non-fatal processing failures thus providing better system availability.

The privilege identifier 64 also provides more efficient privilege tracking of prior resource states. For example, a resource may send a first privileged descriptor request 60 and then start processing another non-privileged descriptor request 60. The privilege identifier 64 allows the high-privilege state to travel along with an associated descriptor request 60. Thus, a resource does not have to continuously monitor the status of a high-privilege descriptor request after the descriptor request is sent. Alternatively, either the resource receiving the descriptor request 60 can monitor and detect a possible failure or can report the failure back to the sending resource via privilege identifier 70D in descriptor response 70.

In another application, the privilege identifier 64 is used for avoiding fatal processing failures. For example, the resources 15 may have associated protection maps that identify particular addresses that are only accessible in a high privileged descriptor request mode. A descriptor request 60 with a low privilege value 64 may attempt to conduct a high-privilege operation on a particular high-privileged address. In this case, the receiving resource will not execute the low-privilege descriptor request 60, and will return a descriptor response indicating a privilege violation.

This avoids a possible fatal system error, for example, when a resource 15 while doing normal processing erroneously sends a descriptor write request 60 to a routing table address, whereas only privileged code generating privileged descriptor requests should be allowed to write to the routing tables. The resource containing the routing table accordingly denies the descriptor write request 60 thus preventing a possible fatal system error. The routing table resource denying the low-privilege descriptor write request 60 can then send a failure notification in descriptor response 70 back to the resource sending the descriptor request 60.

The privileged operations are also described in co-pending patent application, Ser. No. 11/216,437, filed on Aug. 30, 2005, entitled: SELECTIVE ERROR RECOVERY OF PROCESSING COMPLEX USING PRIVILEGE-LEVEL ERROR DISCRIMINATION, which is also herein incorporated in its entirety by reference.

Descriptor Priority

Still referring to FIG. 3, the descriptor requests 60 can also be assigned different priority values 66. The resource interconnect 12 (FIG. 1) can use the priority values 66 to determine the order for forwarding the descriptors to resources. Similarly, the resources 15 can use the priority values 66 to determine in what order to process received descriptor requests 60.

To explain further, the resource interconnect 12, or one or the resources 15, may receive multiple descriptor requests 60 from the same or different resources 15. Descriptor logic described in more detail below in FIG. 4 determines the priority values, if any, associated with the different received descriptor requests 60. In the case of the resource interconnect 12, the highest priority descriptor requests are forwarded first to the associated destination resource. In the case of the resources 15, the order for processing the multiple received descriptor requests is assigned in whole or in part according to their associated priority value 66. In some embodiments, the priority value 66 may incorporate separate priority information for resource interconnect 12 and resource 15. In other embodiments, the priority value 66 might also contain or be used for a priority value 70E in the descriptor response 70.

Figure 4:
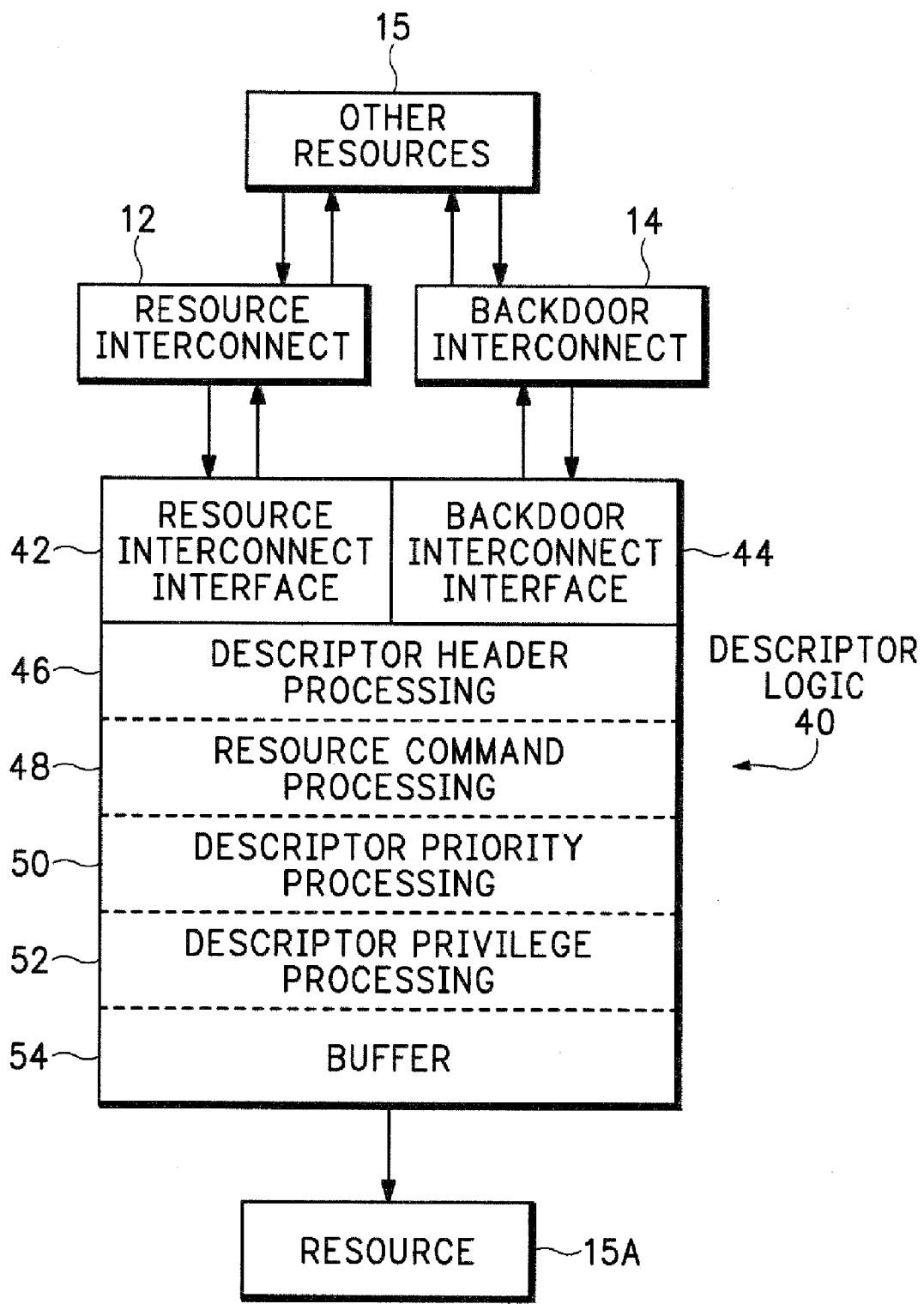
FIG. 4 shows descriptor logic used by the resources and resource interconnect in FIG. 1.

FIG. 4 shows in more detail one example implementation of descriptor logic that may be used in the receive path in the resources 15 for processing descriptors received from the interconnect. Resources that have connections to both the resource interconnect 12 and a backdoor interconnect 14 may include both a resource interconnect interface 42 and a backdoor interconnect interface 44. In some embodiments, there might be two copies or two versions of descriptor logic 40, one for each of the interconnects to the resource.

The descriptor logic 40 includes descriptor header processing logic 46 that formats commands and data from the resources into the descriptors described above. The header processing logic also interprets the different descriptor headers and commands received from other resources. For example, the header processing logic 46 interprets the destination identifier 60A and the source identifier 60B (FIG. 3). Resource command processing logic 48 interprets and executes any commands 60C that may be contained in the descriptors. Descriptor priority processing logic 50 processes the descriptors according to any included priority values 66 as described above in FIG. 3. The descriptor privilege processing logic 52 processes the descriptors according to any included privilege values 64 as described above in FIG. 3. Note that this listing of operations is for example only, and no essential ordering of these operations should be inferred or implied.

The commands and data contained in the descriptors are then buffered, if necessary, in a buffer 54 in the necessary format for access and execution by resource 15A. This buffer may be per-source, per-priority, or organized in any other necessary fashion. In the case of the resource interconnect, the same descriptor format may be retained throughout the descriptor processing. However, the descriptor processing can vary according to different descriptor parameters, such as the priority value 66 described in FIG. 3.

In yet another embodiment, the descriptors received over the resource interconnect interface 42 may be given a different priority than descriptors received over the backdoor interconnect interface 44. For example, the resource 15A may receive a first descriptor request over the resource interconnect interface 42 and a second descriptor request over the backdoor interconnect interface 44. The resource 15A receiving the two descriptor requests may give higher priority to the descriptor requests received over the resource interconnect interface 42. Various forms of arbitration between multiple interface interconnects, such as round-robin, weighted round-robin, etc., are also within the scope of this invention.

As mentioned above, the descriptor logic 40 may either be implemented in hardware, software, or both. In the case of a hardware and software implementation, the hardware/software request number 62 (FIG. 3) is attached to the generated descriptor requests 60. The descriptor response 70 received back in response to the descriptor request 60 has the same associated hardware/software request number 70C. The interfaces 42 and 44 send the descriptor response 70 to the hardware descriptor logic 40 when the received descriptor response 70 includes a hardware request number. Alternatively, the interfaces 42 and 44 send the descriptor response 70 to the software descriptor logic 40 when the received descriptor response 70 includes a software request number.

Interconnect Configurations

In one embodiment, the descriptors, or any other messages, can be sent over the resource interconnect on semi-arbitrary interconnect boundaries. This preserves bandwidth by allowing messages to be sent on sub-interconnect boundaries.

Figure 5:
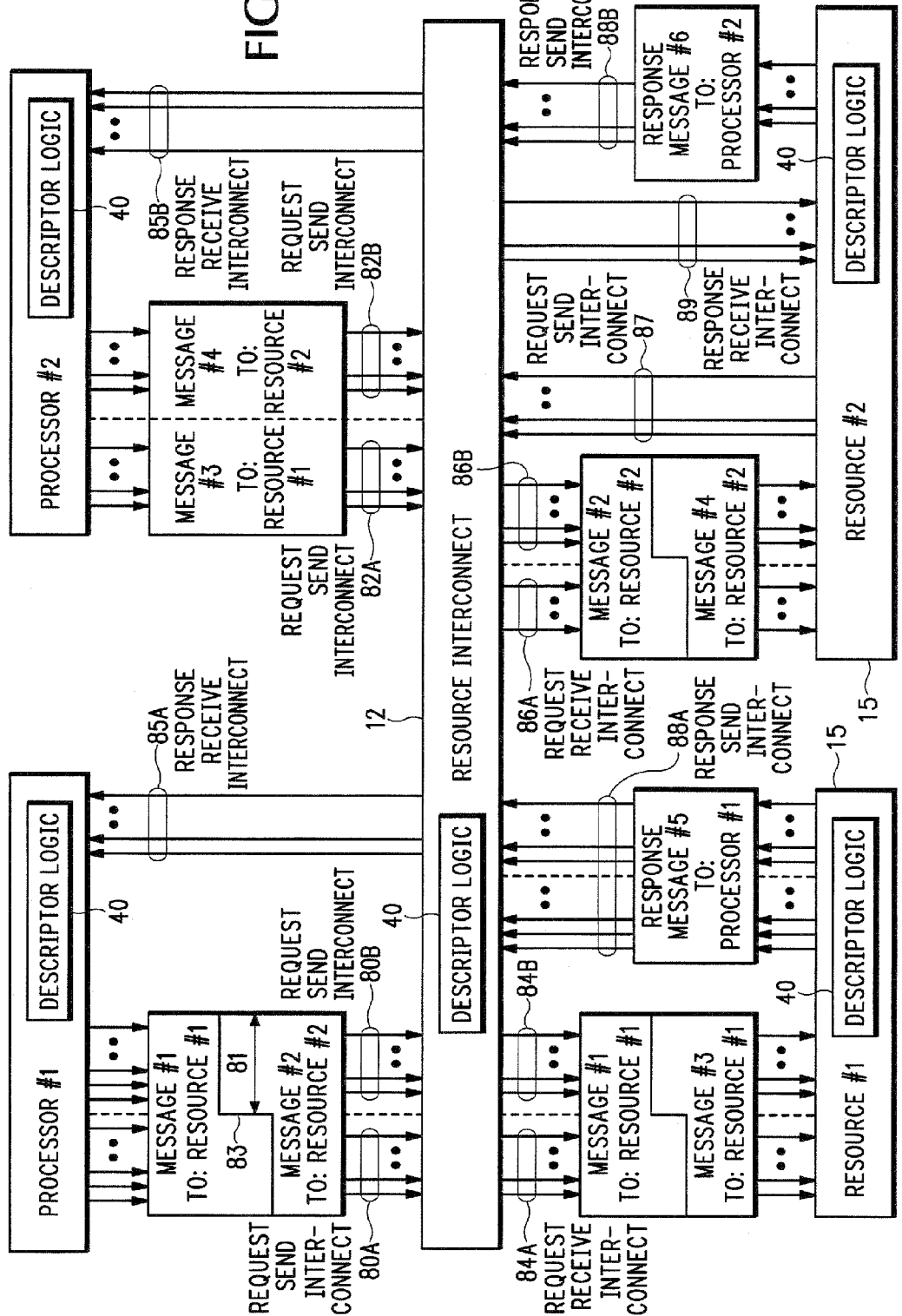
FIG. 5 shows the interconnects for the data processing system in more detail.

FIG. 5 shows a first processor 1 coupled to the resource interconnect 12 by a request-send interconnect 80 and a response-receive interconnect 85A. The request-send interconnect 80 includes two separate sets, or groups, of sub-interconnects 80A and 80B that extend over some arbitrary bit length that can each be used to send the same or different messages. Some or all of the other interconnects in data processing system 10 can also have similar sub-interconnects. For example, processor 2 has two separate request-send sub-interconnects 82A and 82B that can each be used for sending descriptor request messages. Similarly, resource 1 has separate request-receive sub-interconnects 84A and 84B and resource 2 has request-receive sub-interconnects 86A and 86B. In one example, the sub-interconnects may each be 8 bytes wide. However, this is just an example that will be used below for explanation purposes and it should be understood that the sub-interconnects can be any arbitrary bit length.

Processor 1 may assemble a descriptor message 1 for sending to resource 1 that does not end on a 16-byte wide boundary. As described above, the descriptors can be any arbitrary length. For example, message 1 may end at location 83 on an 8-byte boundary. Instead of wasting the additional 8 bytes of available interconnect bandwidth 81, the descriptor logic 40 in processor 1 uses the remaining 8 bytes for sending a next message 2. If the second message 2 extends over more than 8 bytes, then the next 8 bytes are sent over sub-interconnect 80A. Thus, 8 bytes of interconnect bandwidth are salvaged from non-utilization.

The two different messages 1 and 2 are shown overlapping over both sub-interconnect 80A and 80B. However, other schemes can also be used for sending messages over the resource interconnects. For example, the descriptor logic 40 in processor 2 may send a message 3 over a first request-send sub-interconnect 82A and contemporaneously send a second message 4 over a second request-send sub-interconnect 82B. Processor 2 can also send the messages 3 and 4 in a manner that also overlaps sub-interconnects 82A and 82B similar to that shown for interconnect 80. In another embodiment, processor 2 may only have one sub-interconnect 82A, and message 3 and message 4 would be sent sequentially on this one sub-interconnect.

Either way, the resources check every sub-interconnect boundary for the beginning or end of a descriptor message. The descriptor logic 40 then uses a next available sub-interconnect for forwarding a next descriptor message. For example, message 1 from processor 1 and message 3 from processor 2 may both be directed to resource 1. The descriptor logic 40 in the resource interconnect 12 will use sub-interconnects 84A and 84B as shown in FIG. 5 to more efficiently send message 1 and message 3 to resource 1.

As described above, message 1 may end on a non-16 byte boundary. For example, message 1 ends on sub-interconnect boundary 84A. The two sub-interconnects 84A and 84B allow the descriptor logic 40 in resource interconnect 12 to start sending the message 3 on the next available 8 byte sub-interconnect 84B. This saves bandwidth by not having to always start messages from the beginning of interconnect 84. The resource interconnect 12 forwards the two messages 2 and 4 to the resource 2 in a similar manner. Again, if message 2 ends on a non-16-byte interconnect boundary, the resource interconnect 12 can start sending the next message 4 on the next available sub-interconnect boundary.

Any of the resources 15 can have any combination of request-send interconnects, request-receive interconnects, response-send interconnects, and response-receive interconnects. For example, resource 1 has a separate request-receive interconnect 84 and response-send interconnect 88A. The separate interconnects 84 and 88A allow resource 1 to both receive descriptor requests (e.g., messages 1 and 3) from the resource interconnect 12 and send descriptor responses (e.g., message 5) to the resource interconnect 12 at the same time. The response interconnect 88A, or any of the other interconnects shown in FIG. 5, can also have two or more sub-interconnect boundaries similar to the interconnects 80-86 as described above. The response interconnects 88 may use the same resource interconnect 12, or a separate resource interconnect (not shown).

In one implementation, one or more of the processors 1 and 2, or other resources 15, may not receive descriptor requests. For example, the processors 1 and 2 may be core operating units in the data processing system 10 that only issue descriptor requests and receive descriptor responses. In this example, the processors 1 and 2 are not sent descriptor requests 60 (FIG. 3) from any of the other resources 1 and 2. Accordingly, the processors 1 and 2 will not have response-send interconnects or request-receive interconnects and only include request-send interconnects 80, 82 and response-receive interconnects 85A, 85B, respectively.

In other embodiments, particular hardware elements that never need to send descriptor requests may not include request-send and response-receive interconnects. For example, a memory resource may never send a descriptor request. In this situation, the memory resource may only have an incoming request-receive interconnect 84 and an outgoing response-send interconnect 88A, such as shown with resource 1.

Devices that can both source and sink descriptor requests may have separate interconnects for both sourcing descriptor requests and sinking descriptor requests. For example, resource 2 shows a first request-receive interconnect 86 for sinking descriptor requests and a second request-send interconnect 87 for sourcing descriptor requests. Resource 2 also includes a corresponding response-send interconnect 88B for sourcing descriptor responses and response-receive interconnect 89 for sinking descriptor responses.

Resources which are connected to multiple resource interconnects may have different source and sink configurations on each of the resource interconnects to which they are connected. For example, a resource could be just a destination on one resource interconnect in order to receive requests, and just a source on a second resource interconnect in order to send responses.

This flexible communication interconnect architecture allows any resource 15 to both receive and send descriptors thereby allowing more tasks to be offloaded from primary processors. For example, processor 1 can send partially processed data to resource 2 for further processing via a descriptor request 60 (FIG. 3). Processor 1 can then start processing other data, possibly in a separate thread, while resource 2 is autonomously processing the descriptor request 60. Resource 2 can then generate another descriptor request 60 containing the fully processed data to a memory resource without having to communicate back to processor 1. This substantially reduces the processing overhead and time delay for certain high use resources, such as processors 1 and 2. In particular when using multi-threaded processors, long-latency, chained operations which require no processor intervention may be preferable as the processor can be doing meaningful work in other threads while one particular thread awaits the completion of the long-latency operation.

Multi-Threaded Packet Processor

Figure 6:
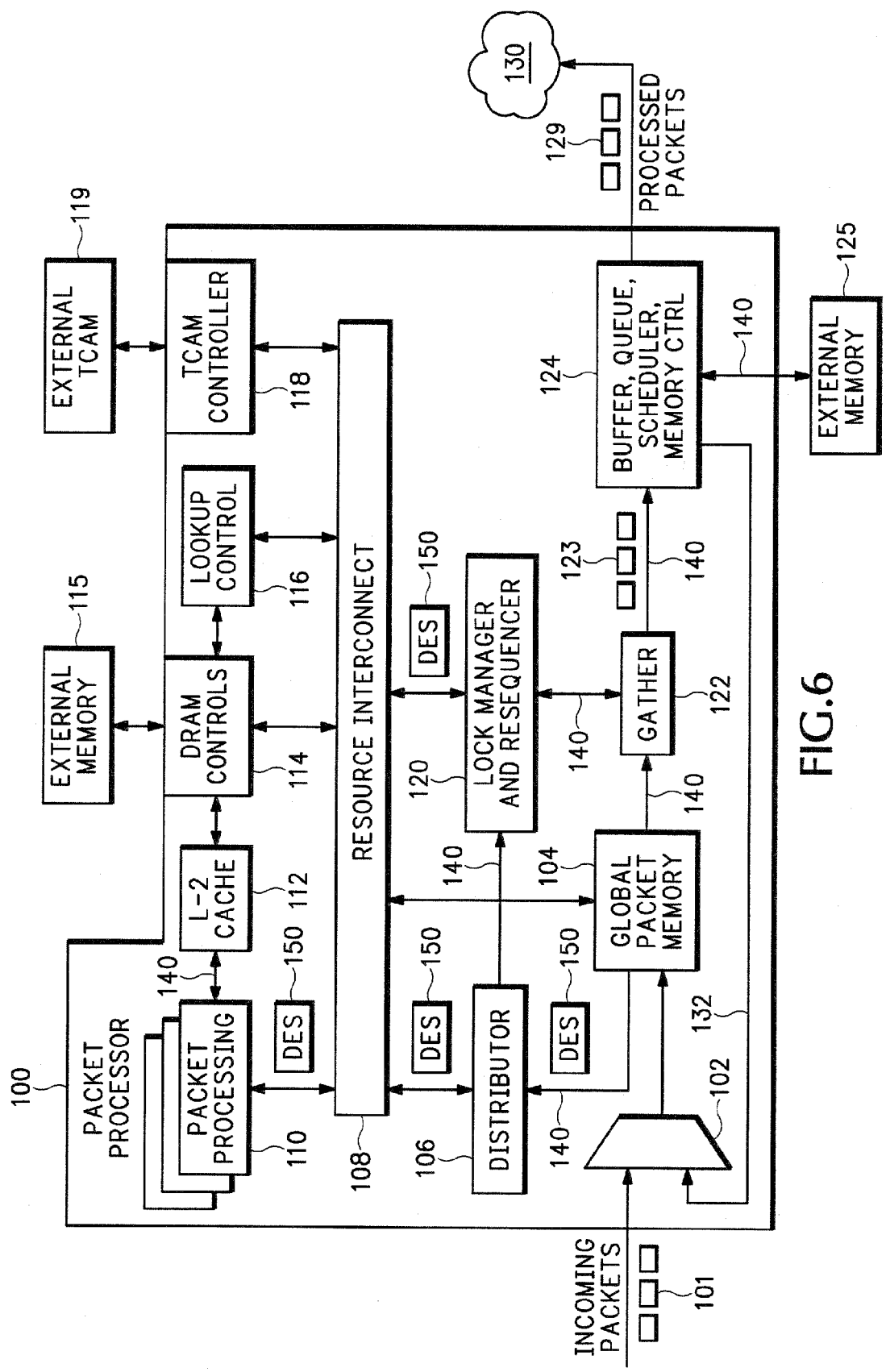
FIG. 6 shows one embodiment of the data processing system configured as a packet processing system.

FIG. 6 is a block diagram of a multi-threaded network processor 100 that may utilize the resource architecture and descriptor protocol described above. Packets 101 are received by the packet processor 100 and typically stored in a Global Packet Memory (GPM) 104 via a multiplexer 102.

After a packet is received, the GPM 104 builds an associated packet handle data structure and also en-queues the packet on a flow lock queue operated by a lock manager and re-sequencer 120. After receiving a reply back from the lock manager 120, the GPM 104 directs a distributor 106 to allocate the packet 101 to Packet Processing Elements (PPEs) 110.

Flow-lock chaining allows flow locks to operate with nested descriptors. Specifically, the nested portion of the descriptor is stored in a flow-lock queue and gets sent on when the nested descriptor reaches the head of the flow-lock queue. This can be used to do atomic updates (e.g., memory ops) in a fixed (packet) order.

The flow lock queue is described in co-pending applications, Ser. No. 10/706,704, filed Nov. 12, 2003, entitled USING ORDERED LOCKING MECHANISMS TO MAINTAIN SEQUENCES OF ITEMS SUCH AS PACKETS; and Ser. No. 10/811,044, filed Mar. 27, 2004, entitled BYPASSING NATIVE STORAGE OPERATIONS BY COMMUNICATING PROTECTED DATA WITHIN LOCKING MESSAGES USING A LOCK MANAGER INDEPENDENT OF THE STORAGE MECHANISM, which are both herein incorporated by reference.

The PPEs 110 process the packets and may use a Level-2 (L2) cache 112, Dynamic Random Access Memory (DRAM) controls 114 and lookup control 116 to access external memory 115. An external Ternary Content Addressable Memory (TCAM) 119 is also accessible by the PPEs 110 through a resource interconnect 108 and a TCAM controller 118. In one embodiment, the term PPE 110 refers to a multi-threaded packet processor. However, some of the features described below can be performed by any generic processing unit with or without multi-threaded capability.

The PPEs 110 may have interlocks that cause a thread to suspend until a particular response is received. This is important for write buffer operations and can be used to guarantee ordering where necessary.

The PPEs 110 inform the lock manager 120 when they have completed processing on a packet. The PPEs 110 are then free to start processing other packets. The packets just processed by the PPEs 110 continue to reside in the GPM 104 and may be stored in a scattered non-contiguous fashion. A gather mechanism 122 is responsible for gathering up the packets and assembling the scattered portions of the packet back together.

The lock manager 120 works with the gather mechanism 122 to determine the final order that the assembled packets 123 are sent from the GPM 104 to a Buffer, Queue, Scheduler (BQS) memory controller 124. The BQS 124 queues, schedules, and dequeues packets offloading this time-consuming task from the PPEs 110. An external memory 125 is used by the BQS 124 as a packet buffer for, among other things, storing packets between different arrival and main processing operations carried out by the PPEs 110.

Various specialized assists for packet processing, such as a Forwarding Information dataBase (FIB) look-up, the TCAM access controller 118, atomic operations to memory, policers, Weighted Random Early Detection (WRED), hashing and modulus, etc., also enable the packet processor 100 to provide increased performance levels.

The packet processor 100 is described in more detail in pending patent application Ser. No. 11/054,076, filed Feb. 8, 2005, entitled MULTI-THREADED PACKETING PROCESSING ARCHITECTURE, which is herein incorporated in its entirety.

The different resources in the packet processor 100 refer to any of the different functional units that can be accessed by the PPEs 110. For example, the PPEs 110, L-2 cache 112, external memory 115, external TCAM 119, global packet memory 104, etc., may all be considered resources. The PPEs may be referred to as core processing units and the other processing elements, including any combination of the lock manager 120, GPM 104, gather 122, and BQS 124, etc., are referred to as ancillary processing elements.

Descriptors 150, similar to those described above, are used for transferring commands and data between the different processing elements in the packet processor 100 over both the resource interconnect 108 and over any combination of backdoor interconnects 140.

Figure 7:
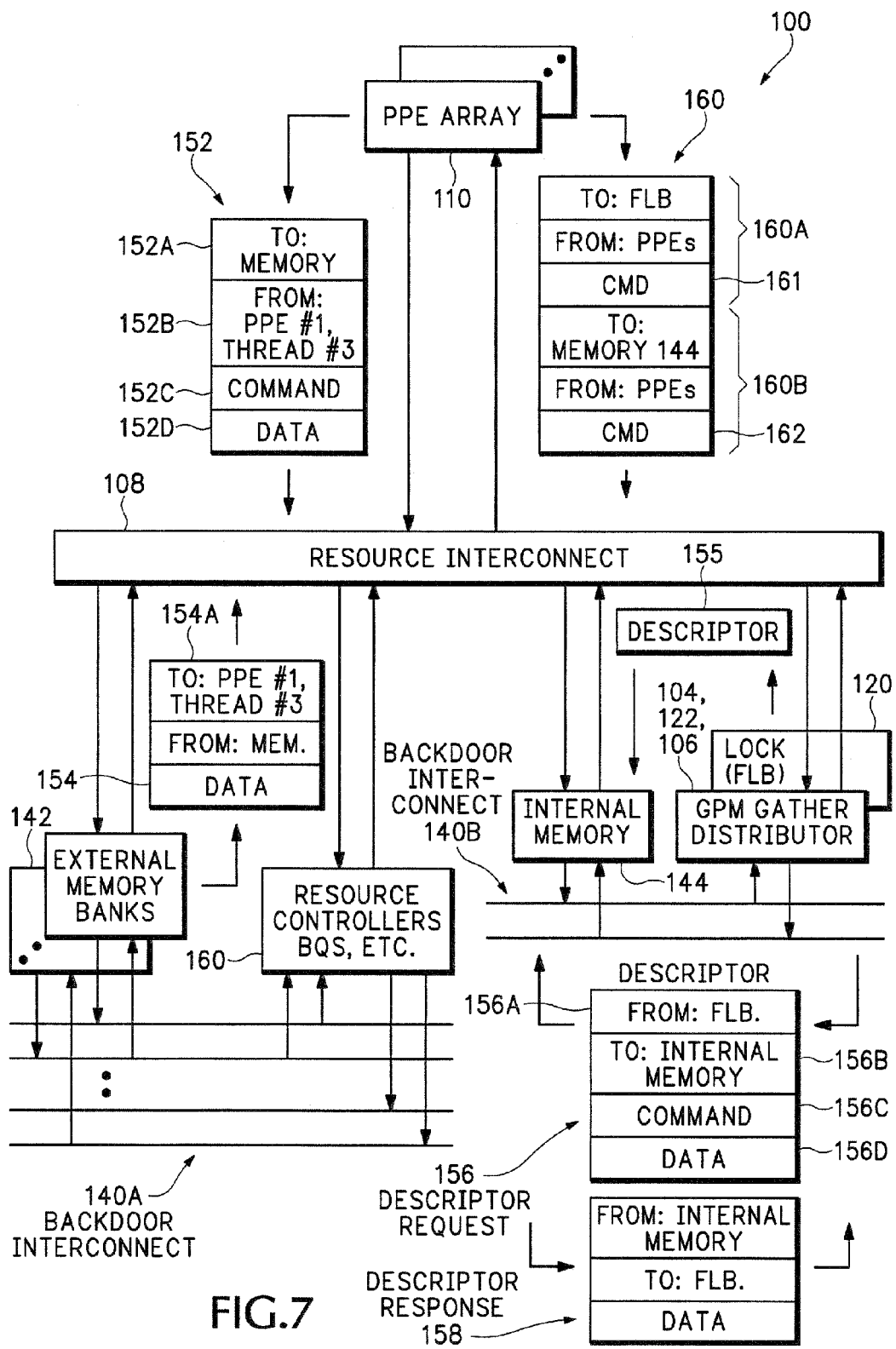
FIG. 7 shows the interconnects for the packet processing system in more detail.

FIG. 7 shows in more detail one example of how the resource interconnect 108 and backdoor interconnects 140 may be used between the different resources shown in FIG. 6. In this example, the PPE's 110 are coupled between the resource interconnect 108 and different external memory banks 142, resource controllers 160, internal memory 144 and the other GPM 104, gather 122, and distributor 106 processing elements.

The resource controllers 160 can be associated with any of the resource elements in FIG. 6 that have backdoor interconnects 140A to external memory 142. For example, the BQS 124 in FIG. 6 may have one or more resources controllers that are directly coupled to one or more external memory banks 142 via the same or different backdoor interconnects 140A. Other backdoor interconnects 140B may separately connect other resources together. For example, the other backdoor interconnects 140B may connect the GPM 104, gather 122, lock manager 120 and distributor 106 together with an internal memory 144. Of course, this is only one example, and other configurations are also possible.

The resource interconnect architecture in the packet processor 100 also allows any of the other non-PPE ancillary packet processing resources to communicate over the resource interconnect 108. For example, the GPM 104, gather 122, lock manager 120 or distributor 106 can communicate with each other and with the internal memory 144 over resource interconnect 108 by exchanging descriptors 155.

In one example, a PPE 110 sends a descriptor request 152 to one of the external memory banks 142 to either read or write data for a particular memory address. The descriptor request 152 includes a destination identifier 152A associated with a particular memory bank 142 and a source identifier 152B associated with a particular PPE 110. The descriptor request 152 also includes an associated memory read or write command 152C and the associated memory address and any associated data 152D.

Since the PPEs 110 may operate multiple threads, the source identifier 152B may identify both a particular PPE 110 and also an associated thread number. Similarly, any descriptor response 154 sent back to the PPE 110 may include a PPE identifier and associated thread number in the destination identifier 154A. In some embodiments, the source identifier 152B, and thus the destination identifier 154A, may include further information to allow PPE 110 to associate the result response with a specific request that it previously originated.

Descriptor logic (see FIG. 4) in the resource interconnect 108 reads the destination identifier 152A and accordingly forwards descriptor request 152 to external memory bank 142. Descriptor logic in the external memory banks 142 reads the information in the descriptor request 152 and accordingly executes the resource command 152C using data 152D. The external memory bank 142 then sends the descriptor response 154 back to the PPE 110 and thread associated with source identifier 152B.

At the same or a different time, one of the ancillary packet processing elements 104, 120, 122, or 106 may send a descriptor request 156 to internal memory 144 over backdoor interconnect 140B. In this example, the Flow Lock Block (FLB) 120 sends the descriptor request 156 to internal memory 144. The internal memory 144 also includes descriptor logic (FIG. 4) that executes a memory operation that corresponds to the command 156C and data 156D in descriptor request 156.

The descriptor logic 40 in internal memory 144 then sends a descriptor response 158 back to the FLB 120 that acknowledges the descriptor request 156 and, if applicable, contains any associated data. Thus, the backdoor interconnects 140 allows multiple different descriptors to be transmitted at the same time without creating a bottleneck in resource interconnect 108.

As mentioned above, nested descriptors can also be used to more efficiently process packet data. For example, one of the PPEs 110 may send a nested descriptor request 160 to the Flow Lock Block (FLB) 120 that includes an attach SRAM command 162. The FLB 120 waits for a packet in a particular packet flow to reach the head of a FLB queue according to a first command 161 in a first nested descriptor request 160A. When the packet reaches the head of the queue, the FLB 120 forwards the second nested descriptor request 160B that includes the attach SRAM command 162 to internal memory 144.

The internal memory 144 executes the attach SRAM command 162 in the forwarded descriptor request 160B and then sends a descriptor response (not shown) back to PPE 110 (over resource interconnect 108) containing the results of the PPE command 162 or acknowledging completion of the command. This eliminates the FLB 120 from having to send an additional descriptor response to the PPE 110 and eliminates the PPE 110 from having to process the FLB descriptor response and then send another descriptor request to internal memory 144. Further, the PPE 110 can start processing other packets after sending the descriptor request 160.

In another embodiment, when a PPE is finished processing a packet, it can send a "release" command to the FLB 120. The FLB 120 will use a backdoor interconnect to notify distributor 106 that the particular requesting thread on that PPE has completed its current packet, and is ready to receive a new packet. Since current packet data is memory mapped from GPM 104 in to the memory of each thread, this operation only has to change the map for the requesting thread to provide it with a new packet. The distributor 106 can assign a new packet to the requesting thread, and then send it a descriptor response on behalf of the FLB 120 to allow it to start processing that packet.

In parallel, and typically some time later, the release request will reach the head of its FLB queue, and the FLB 120 will then send a second request via the same or another backdoor interconnect to notify gather 122 that the previous packet is now properly ordered and can be transmitted from GPM 104. Gather 122 will carry out this operation, using the same or another backdoor interconnect to communicate with GPM 104.

Packet Processor Descriptor Generation

Figure 8:
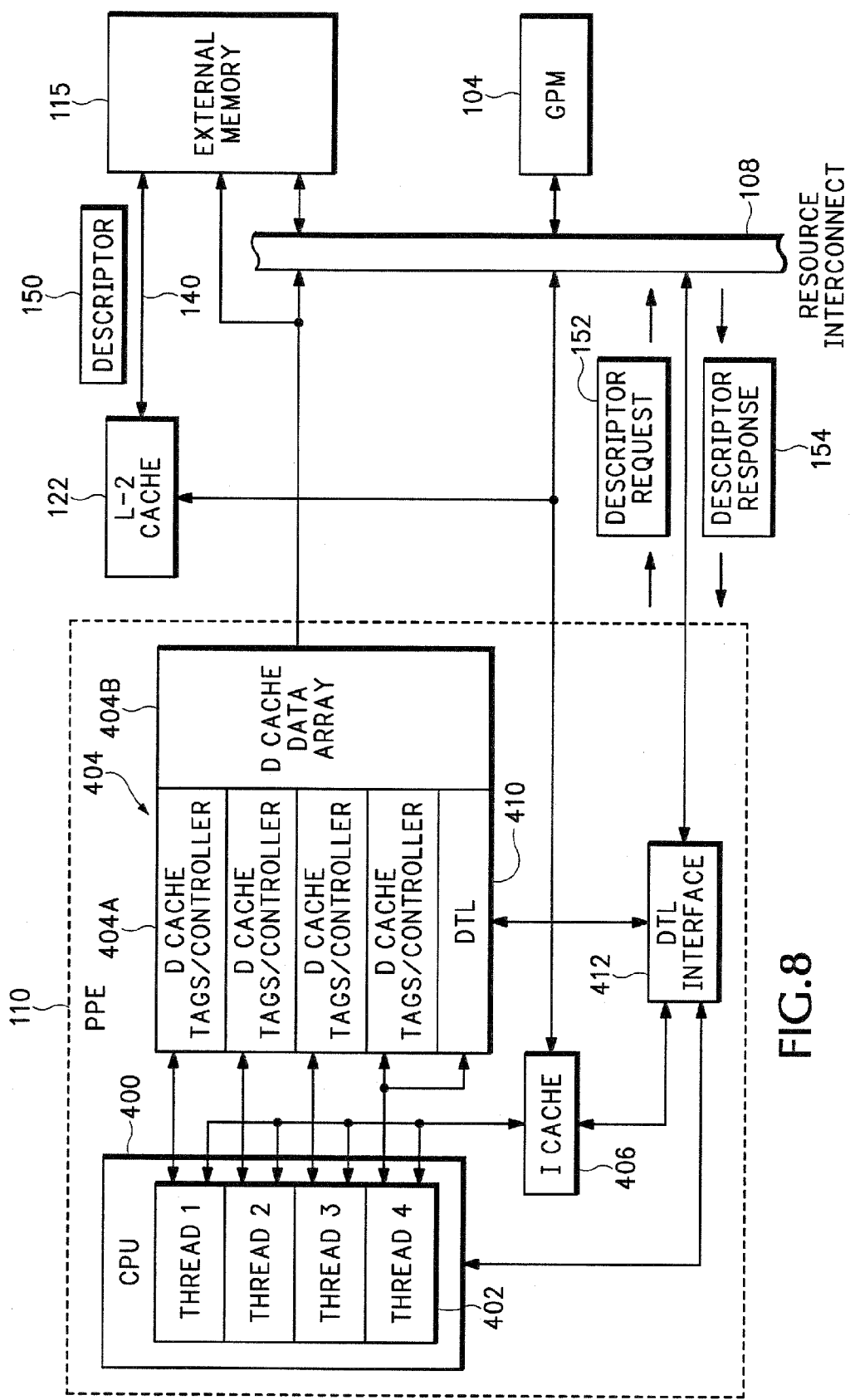
FIG. 8 shows one example of a packet processor element used in the packet processing system.

FIG. 8 shows a more detailed diagram of the circuitry within one of the PPEs 110. A central processing unit 400 can operate multiple threads 402. In this embodiment, each thread 402 can have an associated Data cache (DCACHE) 404 and can share a same Instruction cache (ICACHE) 406. Other cache configurations are also possible where the threads 402 all access the same DCACHE 404 or each have an individual ICACHE 406.

Both the DCACHE 404 and the ICACHE 406 can access external memory 115 and GPM 104 through the resource interconnect 108. In one embodiment, the ICACHE 112 may also access the external memory 115 through an L-2 cache 112 and a backdoor interconnect 140. Of course other memory configurations are also possible where the DCACHE 404 may access external memory 115 through the L-2 cache 112 or the ICACHE 406 may directly access external memory 115.

The multi-threaded PPEs 110 increase throughput by hiding latency when waiting to access slow resources. The resource interconnect 108 provides all PPEs 110 uniform access to all resources shown in FIG. 6. Thus, all PPEs 110 have equal capacity to process any packet. The PPEs 110 each support a stack model, have a Translation Look-aside Buffer (TLB) for protection, and have memory mapping.

The PPEs 110 also include a Descriptor Transfer Logic (DTL) mechanism 410 and DTL interface 412 for supporting the descriptors 150 described above and as described in co-pending provisional patent application, Ser. No. 60/732,079, which has already been incorporated by reference. The DTL mechanism 410 and DTL interface 412 support parallel communications to multiple resources, reliable blocking and non-blocking communication, flexible exception reporting, and stack-based programming languages.

In one embodiment, the DTL 410 is hardware operated in the DCACHE controller 404A that includes the descriptor logic described above in FIG. 4. Particular commands can be sent by the threads 402 to initiate operation by the DTL interface 412. The DTL 412 converts commands and any associated data into descriptor requests 152. Similarly, any descriptor responses 154 received back from any of the other resources may include a hardware request number 70C (FIG. 3) that is detected by the DTL interface 412 and then processed by the DTL hardware 410. Similar DTL circuitry may also be utilized in the ICACHE 406. In some embodiments, there may be one DTL circuit that is shared by the threads for software-generated DTL requests, and by the ICACHE and DCACHE for hardware-generated requests.

As described above in FIG. 7, the resource receiving a descriptor request 152 sends back a descriptor response 154 either when the descriptor request 152 is executed or received. The descriptor response 154 includes a hardware/software request number 70C corresponding to a hardware/software request number 62 sent in the descriptor request 152 (see FIG. 3). The DTL interface 412 uses the request number 70C to first determine whether or not the descriptor should be processed by the DTL hardware 410 or by software in CPU 400. Further, the PPEs 110 use the request number 70C to track the number of outstanding hardware and software descriptor requests 152 for each associated thread 402.

In some embodiments, the DTL hardware 412 may receive all descriptor responses 154, and make responses to software requests available for software to access, such as through a processor-accessible status register. In some embodiments, the data portion of a software response may be written in to a reserved area of the DCACHE 404 for a requesting thread 402, or in to a special hardware memory reserved for such responses. In some embodiments, DTL hardware 410 may directly process the responses to hardware requests, for example by writing the data portion of the response in to the DCACHE 404 and validating the corresponding cache tags.

As described above, hardware generated descriptors may be built due to a cache miss and get sent to a memory resource. Software descriptor responses can go into the data cache or a separate, hardware-writable-and-software-readable buffer. Hardware descriptor responses get processed by the requesting cache and update the data portion of the cache and its tags.

The system described above can use dedicated processor systems, micro-controllers, programmable logic devices, or microprocessors that perform some or all of the operations described above. Some of the operations may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A data processing system, comprising:
   a first interconnect coupled between multiple different resources and configured to be shared between the multiple different resources for sending and receiving descriptors, wherein the descriptors are used by the different resources for communicating across the first interconnect, the descriptors including a destination identifier configured to identify one of the resources receiving the descriptors sent on the first interconnect and a source identifier configured to identify one of the resources sending the descriptors on the first interconnect;
   a second interconnect separate from the first interconnect and separately coupled from the first interconnect between the multiple different resources, wherein the second interconnect is configured to be shared between the multiple different resources for sending and receiving the descriptors independently of the first interconnect; and
   a processor configured to send a request in a first one of the descriptors to a first resource from among the multiple different resources over the first interconnect, wherein the first resource is configured to receive the request via the first interconnect and communicate over the second interconnect with a second resource from among the multiple different resources using a second one of the descriptors, wherein the second resource is configured to respond back to the processor using a third one of the descriptors over one of the first or second interconnect pursuant to the request.

2. The data processing system according to claim 1 wherein the the first and second interconnect each comprise an interconnection mesh that selectively connecting the different resources together according to the destination identifier or source identifier in the descriptors.

3. The data processing system according to claim 1 wherein the first interconnect and the second interconnect are part of the same resource interconnect circuit.

4. The data processing system according to claim 1 wherein the first interconnect is part of a central resource interconnect and the second interconnect is part of a backdoor interconnect that is configured to operate independently of the central resource interconnect.

5. The data processing system according to claim 4 wherein the backdoor interconnect is configured to operate in parallel with the central resource interconnect so that two different messages can be sent and two different messages can be received by the same processor or resource at the same time.

6. The data processing system according to claim 1 wherein at least one of the first and second interconnect are configured to carry messages on sub-interconnect boundaries.

7. The data processing system according to claim 1 wherein the first resource is configured to use the descriptors for communicating over both the first and second interconnect.

8. The data processing system according to claim 7 wherein the processor includes descriptor hardware logic configured to generate the descriptors in hardware and descriptor software logic configured to generate the descriptors in software.

9. The data processing system according to claim 8 wherein the processor is configured to generate the descriptors in hardware when there is a cache miss and then send the hardware generated descriptors to a memory resource.

10. The data processing system according to claim 8 wherein the processor includes a descriptor interface configured to direct hardware identified descriptor responses to the descriptor hardware logic and direct received software identified descriptor responses to the descriptor software logic.

11. The data processing system according to claim 7 wherein at least one of the first resource or second resource is configured to conduct an operation for at least one of the group including failure processing and data processing according to descriptor privilege identifiers.

12. The data processing system according to claim 11 wherein at least one of the first resource or second resource is configured to return a descriptor response back to the processor indicating success or failure of the operation, the processor also configured to then conduct an operation associated with the descriptor response.

13. The data processing system according to claim 7 wherein the descriptors vary in size according to an associated descriptor command.

14. The data processing system according to claim 1 wherein at least one of the processor, first resource, second resource, first interconnect, or second interconnect is configured to prioritize request processing according to priority identifiers in the request.

15. The data processing system according to claim 1 wherein at least one of the processor, first resource, or second resource includes a descriptor request-receive interconnect for receiving descriptor requests and a separate descriptor response-send interconnect for sending responses to the descriptor requests.

16. The data processing system according to claim 1 wherein at least one of the processor, first resource, or second resource includes a descriptor request-send interconnect for sending descriptor requests and a separate descriptor response-receive interconnect for receiving responses to the descriptor requests.

17. The data processing system according to claim 1 including:
   a nested descriptor that includes a first descriptor that causes the first resource to execute at least a portion of the nested descriptor and then forward results and/or status to the second resource,
   the nested descriptor including a second descriptor separate from the first descriptor that is executed by the second resource separately from the first resource and configured to cause the second resource to continue execution of the nested descriptor and then forward subsequent results and/or status in a response descriptor back to the processor.

18. A method for operating a data processing device, comprising:
   generating descriptor requests including source identifiers, destination identifiers and commands, wherein at least one of the descriptor requests is a nested descriptor comprising:
      a first descriptor located within the nested descriptor that has a first destination identifier identifying a primary resource and an associated first command configured to be executed by the primary resource; and
      a second separate descriptor located within the same nested descriptor that has a second destination identifier identifying a secondary resource and an associated second command configured to be executed by the secondary resource;
   using the first destination identifier to send the nested descriptor over a resource interconnect to the primary resource, the primary resource executing the first command in the nested descriptor;
   using the second destination identifier to send the nested descriptor from the primary resource to the secondary resource, wherein the secondary resource executes the second command in the nested descriptor; and
   using a source identifier in the nested descriptor to send a response descriptor from the secondary resource over the resource interconnect to a third one of the resources.

19. The method according to claim 18 including sending the nested descriptor from the primary resource to the secondary resource over a backdoor interconnect that is connected to the primary and secondary resource independently of the resource interconnect.

20. The method according to claim 18 including:
   generating sub-unit identifiers in the descriptor requests for identifying processor sub-units associated with the descriptor requests; and
   using the sub-unit identifiers to track outstanding processor descriptor requests generated by the processor sub-units.

21. The method according to claim 20 including:
   using the sub-unit identifiers to identify descriptor requests generated either by hardware or software;
   sending the descriptor requests to the resources;
   receiving descriptor responses to the descriptor requests that include the hardware/software identifiers from the descriptor requests; and
   processing the descriptor responses either in hardware or software according to the received hardware/software identifiers.

22. The method according to claim 18 including:
   receiving descriptor requests that include privilege identifiers;
   detecting privilege violations or execution failures executing the received descriptor requests; and
   generating failure notifications according to the privilege identifiers.

23. The method according to claim 22 including:
   receiving a first descriptor request having a high privilege identifier;
   receiving a second descriptor request having a low privilege identifier;
   generating a fatal error notice when execution of the first descriptor request fails; and
   generating a non-fatal error notice when execution of the second descriptor request fails.

24. The method according to claim 18 including:
   receiving descriptor requests that include associated priority identifiers; and
   processing the descriptor requests according to the associated priority identifiers.

25. The method according to claim 18 including:
   sending a first descriptor starting from a first sub-interconnect boundary on a interconnect; and
   sending a second descriptor starting from a second sub-interconnect boundary on the same interconnect.

26. The method according to claim 18 wherein resources connected to the resource interconnect perform one or more of the following:
   sending descriptor requests on a first set of interconnects;
   sending descriptor responses on a second set of interconnects;
   receiving descriptor requests on a third set of interconnects; and
   receiving descriptor responses on a fourth set of interconnects.

27. An apparatus, comprising:
   a first interconnect coupled between multiple different resources and configured to be shared between the multiple different resources for sending and receiving messages;
   a second interconnect separately coupled between the same multiple different resources, wherein the second interconnect is configured to be shared between the multiple different resources for sending and receiving messages independently of the messages sent and received over the first interconnect; and a processor configured to send a first message to a first one of the resources over the first interconnect, wherein:

the first resource is configured to both receive the first message over the first interconnect and send a second message to a second one of the resources over the second interconnect at the same time, and the second resource is configured to process the second message received over the second interconnect and send a third message back to the processor over the first interconnect responsive to the second message received from the first resource over the second interconnect.

28. The apparatus of claim 27 wherein the first and second interconnect are both cross-bar switches.

29. The apparatus of claim 27, wherein the first and second message are both part of a same nested descriptor comprising:

a first descriptor located within the nested descriptor that has a first destination identifier identifying the first resource and an associated first command configured to be executed by the first resource;

a second descriptor located within the same nested descriptor that has a second destination identifier identifying the second resource and an associated second command configured to be executed by the second resource; and a source identifier located within the same nested descriptor identifying the processor as a destination for the third message.

* * * * *

UNITED STATES PATENT AND TRADEMARK OFFICE
CERTIFICATE OF CORRECTION

PATENT NO. : 7,664,897 B2  Page 1 of 1
APPLICATION NO. : 11/293285
DATED : February 16, 2010
INVENTOR(S) : Cohen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1072 days.

Signed and Sealed this

Twenty-eighth Day of December, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,664,897 B2 |
| APPLICATION NO. | : 11/293285 |
| DATED | : February 16, 2010 |
| INVENTOR(S) | : Cohen et al. |

It is certified that error appears in the above-identified patent and that said Letters Patent is hereby corrected as shown below:

At column 16, line 22, please replace "the the" with --the--.

Signed and Sealed this
Twenty-seventh Day of September, 2011

David J. Kappos
*Director of the United States Patent and Trademark Office*